(12) United States Patent
Arnold et al.

(10) Patent No.: US 8,967,956 B2
(45) Date of Patent: Mar. 3, 2015

(54) TURBOCHARGER VARIABLE-NOZZLE ASSEMBLY WITH VANE SEALING ARRANGEMENT

(75) Inventors: Philippe Arnold, Hennecourt (FR); Denis Jeckel, Epinal (FR); Dominique Petitjean, Julienrupt (FR); Pierre Barthelet, Thaon les Vosges (FR); Emmanuel Severin, Thaon les Vosges (FR); Nicolas Morand, Vosges (FR); Karl-Heinz Bauer, La Rippe (CH); Chris Groves, Domevre sur Dubrion Vosges (FR)

(73) Assignee: Honeywell International Inc., Morristown, NJ (US)

( * ) Notice: Subject to any disclaimer, the term of this patent is extended or adjusted under 35 U.S.C. 154(b) by 828 days.

(21) Appl. No.: 13/245,263

(22) Filed: Sep. 26, 2011

(65) Prior Publication Data
US 2013/0078082 A1 Mar. 28, 2013

(51) Int. Cl.
| F01B 25/02 | (2006.01) |
| F01D 17/12 | (2006.01) |
| F01D 17/16 | (2006.01) |
| F02C 6/12 | (2006.01) |

(52) U.S. Cl.
CPC . *F01D 17/16* (2013.01); *F02C 6/12* (2013.01); *F05D 2240/12* (2013.01)
USPC .......................................... 415/158; 415/166

(58) Field of Classification Search
USPC ......... 415/148, 151, 157, 158, 160, 165, 166, 415/167, 183, 184, 185, 191, 203, 204, 206, 415/210.1
See application file for complete search history.

(56) References Cited

U.S. PATENT DOCUMENTS

| 4,973,223 A * | 11/1990 | Franklin ........................ 415/157 |
| 7,114,919 B2 * | 10/2006 | Scholz et al. .................. 415/164 |
| 8,021,107 B2 * | 9/2011 | Espasa et al. ................... 415/160 |
| 8,668,443 B2 * | 3/2014 | Espasa et al. ................... 415/160 |
| 2008/0240906 A1 * | 10/2008 | Barthelet et al. .............. 415/148 |
| 2011/0206500 A1 * | 8/2011 | Nagao et al. ................... 415/148 |

FOREIGN PATENT DOCUMENTS

WO WO 2004/027218 A1 4/2004

* cited by examiner

*Primary Examiner* — Edward Look
*Assistant Examiner* — Christopher J Hargitt
(74) *Attorney, Agent, or Firm* — John C. James

(57) ABSTRACT

A variable-nozzle assembly for a turbocharger includes a generally annular nozzle ring and an array of vanes rotatably mounted to the nozzle ring such that the vanes can be pivoted about their axes for regulating exhaust gas flow to the turbine wheel. A unison ring engages vane arms that are affixed to axles of the vanes, such that rotation of the unison ring causes the vanes to pivot between a closed position and an open position. The vanes have proximal ends that are adjacent a face of the nozzle ring. A vane sealing member is supported on the nozzle ring and has a portion disposed between the proximal ends of the vanes and the face of the nozzle ring. The unison ring includes cams that engage cam followers. Rotational movement of the unison ring causes the cam followers to be moved axially and thereby urge the vane sealing member against the proximal ends of the vanes.

10 Claims, 12 Drawing Sheets

TURBOCHARGER VARIABLE-NOZZLE ASSEMBLY WITH VANE SEALING ARRANGEMENT

BACKGROUND OF THE INVENTION

The present invention relates to turbochargers having a variable-nozzle turbine in which an array of movable vanes is disposed in the nozzle of the turbine for regulating exhaust gas flow into the turbine.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

One of the challenges in boosting engine performance with a turbocharger is achieving a desired amount of engine power output throughout the entire operating range of the engine. It has been found that this objective is often not readily attainable with a fixed-geometry turbocharger, and hence variable-geometry turbochargers have been developed with the objective of providing a greater degree of control over the amount of boost provided by the turbocharger. One type of variable-geometry turbocharger is the variable-nozzle turbocharger (VNT), which includes an array of variable vanes in the turbine nozzle. The vanes are pivotally mounted in the nozzle and are connected to a mechanism that enables the setting angles of the vanes to be varied. Changing the setting angles of the vanes has the effect of changing the effective flow area in the turbine nozzle, and thus the flow of exhaust gas to the turbine wheel can be regulated by controlling the vane positions. In this manner, the power output of the turbine can be regulated, which allows engine power output to be controlled to a greater extent than is generally possible with a fixed-geometry turbocharger.

One such variable-nozzle assembly comprises a generally annular nozzle ring that supports the array of vanes. The vanes are rotatably mounted to the nozzle ring and connected to a rotatable actuator ring such that rotation of the actuator ring rotates the vanes for regulating exhaust gas flow to the turbine wheel.

The above-described variable-nozzle assembly is effective, but further improvements are sought.

BRIEF SUMMARY OF THE DISCLOSURE

In particular, an area of potential improvement relates to the sealing between the vanes and one wall of the nozzle formed by the nozzle ring. Typical variable-nozzle assemblies are constructed such that there are gaps between the ends of the vanes and the adjacent walls of the nozzle. It is probably not possible to completely eliminate such gaps at all times, inasmuch as the vanes must be able to pivot, but reducing the widths of the gaps should result in improved turbine performance because less of the exhaust gas would leak through the gaps. The challenge then becomes how to reduce the sizes of the gaps without impairing the ability of the vanes to pivot.

The present disclosure addresses the above needs and achieves other advantages, by providing a turbocharger having a variable-nozzle assembly, comprising:

a compressor housing and a compressor wheel mounted in the compressor housing and connected to a rotatable shaft, and a turbine housing and a turbine wheel mounted in the turbine housing and connected to the rotatable shaft, the turbine housing defining a chamber surrounding the turbine wheel for receiving exhaust gas from an engine and for supplying the exhaust gas through a nozzle leading from the chamber generally radially inwardly to the turbine wheel, the turbine housing further defining an axial bore;

a nozzle ring having opposite first and second faces, the nozzle being defined between the second face and an opposite wall, the nozzle ring having a plurality of circumferentially spaced-apart bearing apertures each extending axially from the first face to the second face;

a plurality of vanes disposed in the nozzle and each having a proximal end and a distal end, the proximal ends of the vanes being proximate the second face of the nozzle ring, axles being joined to the proximal ends and being received into the bearing apertures of the nozzle ring and being rotatable in the bearing apertures, the vanes being rotatable between a closed position and an open position;

a plurality of vane arms adjacent the first face of the nozzle ring and respectively affixed rigidly to the axles, each vane arm having a free end;

a unison ring positioned generally coaxially with the nozzle ring with a face of the unison ring opposing the first face of the nozzle ring, the unison ring being engaged with the free ends of the vane arms and being rotatable about an axis of the nozzle ring so as to pivot the vane arms, thereby pivoting the vanes in unison, the unison ring having a closed position corresponding to the closed position of the vanes and an open position corresponding to the open position of the vanes;

a vane sealing member having a portion disposed between the second face of the nozzle ring and the proximal ends of the vanes; and a cam arrangement by which the unison ring engages the vane sealing member during rotation of the unison ring to the closed position, the cam arrangement being configured to move the vane sealing member in a first axial direction against the proximal ends of the vanes when the unison ring is moved to the closed position, and being configured to allow the vane sealing member to move in a second axial direction opposite to the first axial direction when the unison ring is moved out of the closed position.

In some embodiments, the cam arrangement comprises a plurality of circumferentially spaced cams formed on the unison ring, each cam being sloped along a direction in which the cam moves when the unison ring is rotated to the closed position. The cam arrangement further comprising a plurality of cam followers, each cam follower having a first end that engages a respective one of the cams and an opposite second end that urges the vane sealing member in the first axial direction when the unison ring is rotated to the closed position.

In a particular embodiment the cam followers comprise integrally formed portions of the vane sealing member. The vane sealing member can be generally annular and the cam followers can comprise protrusions that extend from a radially outer edge of the vane sealing member. Each protrusion can have a portion that extends generally axially and terminates in an end configured for engaging a respective one of the cams.

In one embodiment, the vane sealing member comprises a sheet metal part and the protrusions comprise sheet metal portions that are bent to form the portions that extend generally axially. The ends of the protrusions optionally can define foot portions that are bent to extend generally perpendicular to the portions that extend generally axially, the foot portions engaging the cams of the unison ring.

In another embodiment, the cam followers can be formed separately from the vane sealing member. For example, the nozzle ring can define a plurality of bores extending axially therethrough, and the cam followers can extend through the bores. The cam followers can comprise pins.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE DRAWINGS

The present inventions now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
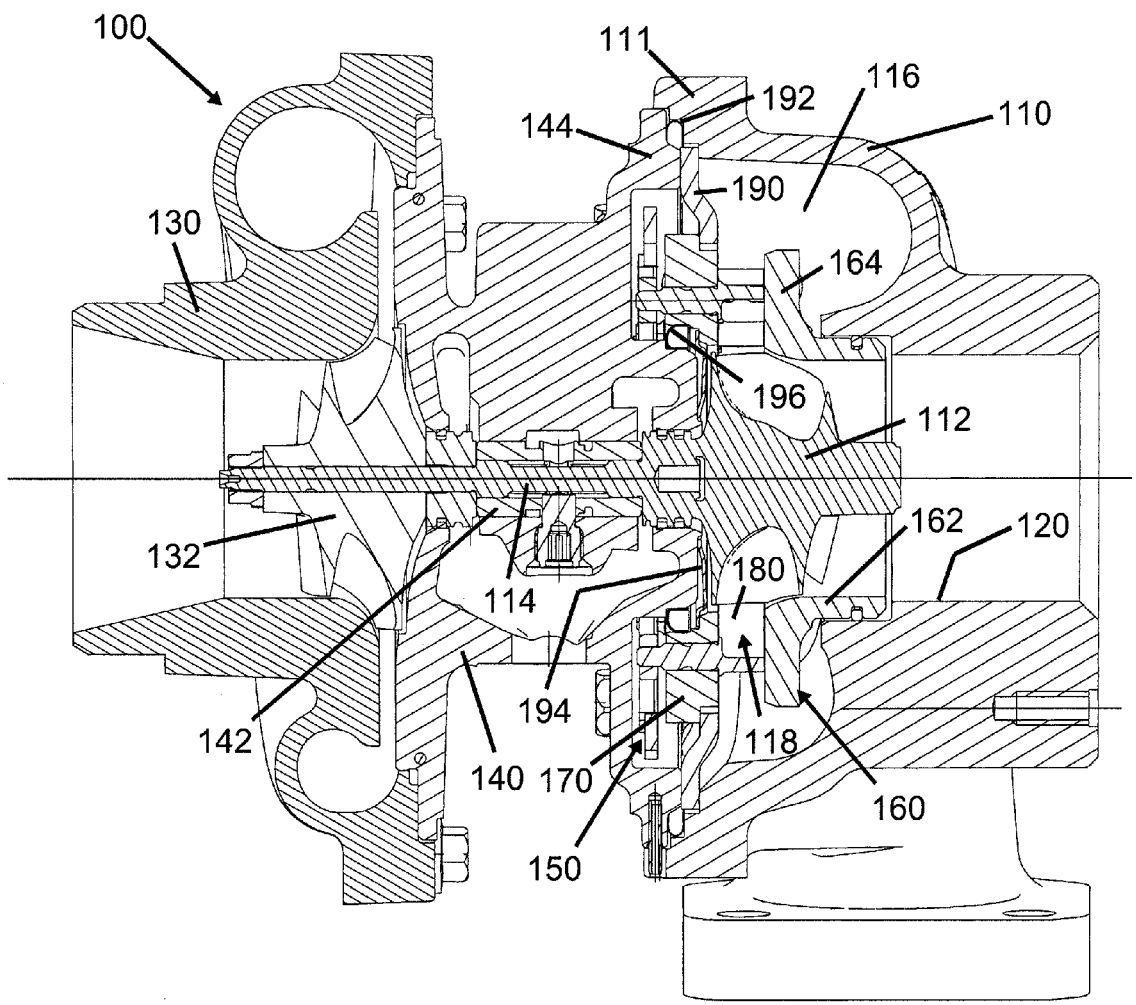
FIG. 1 is a cross-sectional view of a turbocharger having a variable-nozzle assembly in accordance with an embodiment of the invention.

A turbocharger 100 in accordance with one embodiment of the invention is shown in FIG. 1. The turbocharger includes a turbine comprising a turbine housing 110 and a turbine wheel 112 mounted in the turbine housing and connected to a rotatable shaft 114 for rotation therewith. The turbine housing defines a chamber 116 surrounding the turbine wheel for receiving exhaust gas, and there is a nozzle 118 leading from the chamber generally radially inwardly to the turbine wheel. The turbine housing also defines an axially extending bore 120 through which exhaust gas is discharged after passing through the turbine wheel.

The turbocharger further comprises a compressor comprising a compressor housing 130 and a compressor wheel 132 mounted in the compressor housing and connected to the rotatable shaft 114 for rotation therewith. A center housing 140 is connected between the compressor housing 130 and the turbine housing 110. The shaft 114 passes through the center housing, which supports bearings 142 for the shaft.

The turbocharger further comprises a variable-nozzle assembly 150 that includes an insert 160 having a tubular portion 162 received into the bore 120 of the turbine housing and having a generally annular nozzle portion 164 extending generally radially out from one end of the tubular portion. The variable-nozzle assembly 150 also includes a generally annular nozzle ring 170 axially spaced from the nozzle portion 164, and an array of vanes 180 circumferentially spaced about the nozzle ring and rotatably mounted to the nozzle ring such that the vanes are variable in setting angle for regulating exhaust gas flow to the turbine wheel. The nozzle ring 170 is rigidly affixed to the nozzle portion 164, such as by rigid spacers 166 (FIGS. 2 and 3) that extend between these parts and maintain a fixed spacing between them.

The turbine housing 110 includes a generally ring-shaped flange 111 that opposes a flange 144 of the center housing 140. The turbine housing flange 111 and center housing flange 144 have opposing axially facing surfaces that are stepped such that there is a radially outer pair of opposing surfaces and a radially inner pair of opposing surfaces. A radially outer portion of a generally annular retainer ring 190 is disposed and clamped between the inner pair of opposing surfaces. A resilient sealing ring 192 is disposed and axially compressed between the outer pair of opposing surfaces. In the illustrated embodiment, the sealing ring 192 has a generally U-shaped cross-section oriented such that an open side of the U faces radially inwardly. However, other configurations of sealing ring can be used. A radially inner portion of the retainer ring 190 engages an axially downstream-facing surface of the nozzle ring 170 and thereby limits the extent to which the nozzle ring 170 can move axially in the downstream direction (i.e., to the right in FIG. 1).

A spring element 194, which in the illustrated embodiment also comprises a heat shield, is disposed between a radially inner portion of the nozzle ring 170 and a portion of the center housing 140. The heat shield 194 is a sheet metal part constructed of a resilient metal, and the heat shield has a non-flat configuration such that the heat shield acts as a spring element when axially compressed. The heat shield is generally annular and has a radially outer portion engaged against an axially upstream-facing surface of the nozzle ring 170 and a radially inner portion engaged against an axially downstream-facing surface of the center housing 140. The heat shield is axially compressed between these surfaces.

A resilient radially-compressible locator ring 196 is disposed between a radially inward-facing surface of the nozzle ring 170 and a radially outward-facing surface of the center housing 140 and is engaged against the inward- and outward-facing surfaces so as to radially locate the nozzle ring with respect to the center housing. The locator ring comprises a generally annular body having a generally C-shaped cross-section that defines a radially outer leg and a radially inner leg, the radially outer leg engaged against the radially inward-facing surface of the nozzle ring 170 and the radially inner leg engaged against the radially outward-facing surface of the center housing 140.

With reference to FIGS. 2 through 7, a first embodiment of a variable-nozzle assembly 150 in accordance with the invention is depicted. The vanes 180 have proximal ends 182 and opposite distal ends 184. The proximal ends 182 of the vanes are rigidly affixed to axles 186 (FIG. 4) of generally cylindrical form. The nozzle ring 170 includes bearing apertures that extend axially through the nozzle ring 170. The axles 186 of the vanes pass through the bearing apertures with a loose enough fit to allow the axles to rotate about their axes, but the clearance between the axles and the apertures is small enough to substantially fix the axial orientation of the axes of rotation of the axles.

The axles 186 have distal ends that project out from the bearing apertures beyond the first face 172 of the nozzle ring. Vane arms 188 (partially visible in FIG. 4) are rigidly joined to the distal ends of the axles 186. The vane arms have opposite free ends that engage a unison ring 210 disposed adjacent the first face 172 of the nozzle ring. The unison ring 210 is generally coaxial with the nozzle ring and is rotatable about its axis, actuated by a suitable actuator (not shown). Rotation of the unison ring in one direction causes the vane arms 188 to pivot in a direction that pivots the vanes 180 toward their open position; rotation of the unison ring in the other direction pivots the vanes toward their closed position.

Figure 7:
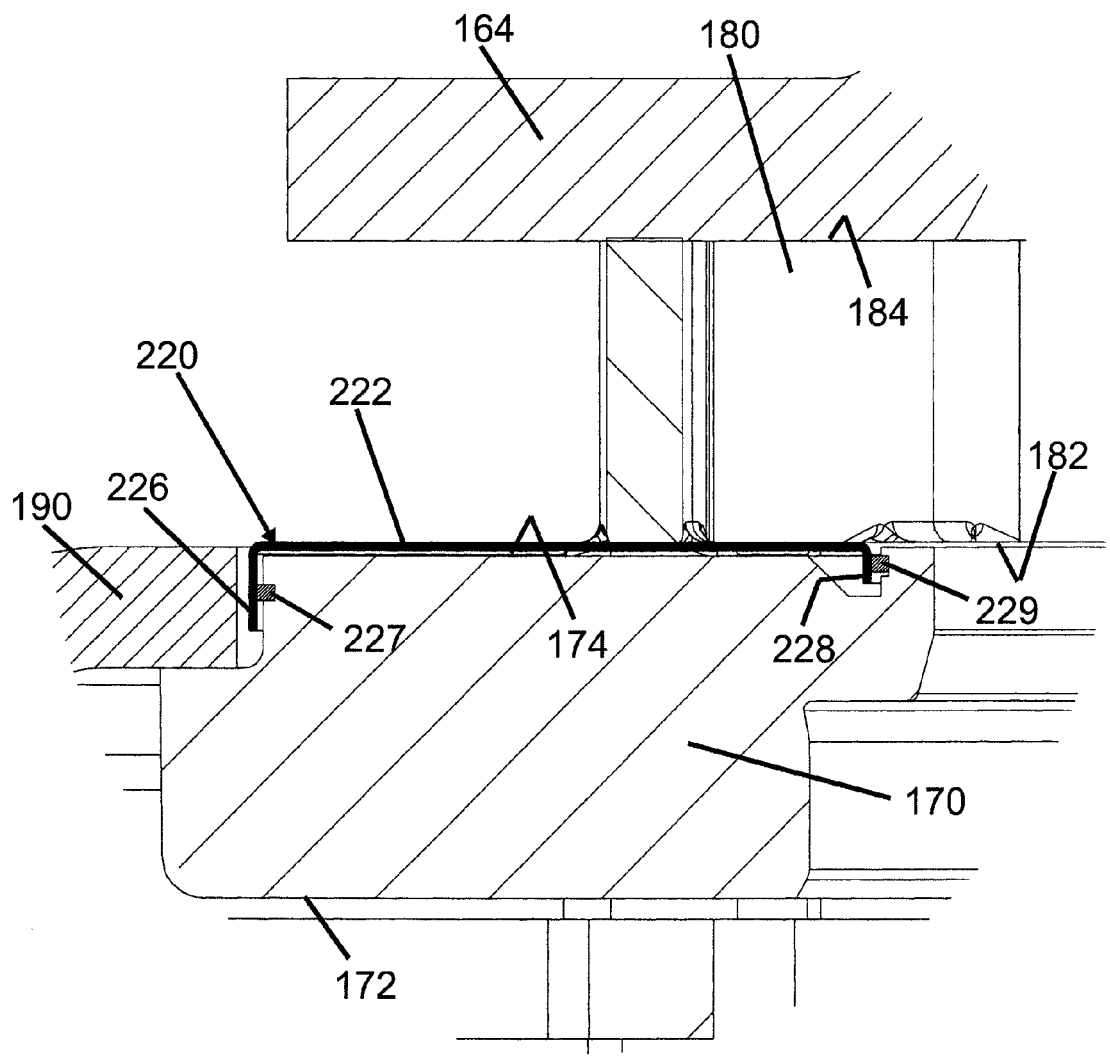
FIG. 7 shows a fragmentary portion of FIG. 6 on an enlarged scale.

In accordance with the invention, the variable-nozzle assembly 150 includes a generally annular vane sealing member 220 formed separately from the nozzle ring 170 and supported on the nozzle ring 170. As best seen in FIG. 7, the vane sealing member 220 has a portion 222 that is disposed between the proximal ends 182 of the vanes 180 and the second face 174 of the nozzle ring 170. The vane sealing member 220 can be a thin sheet metal part.

In one embodiment, the vane sealing member 220 includes a flange 226 that extends generally axially from a radially outer edge of the vane sealing member. The flange 226 extends adjacent to a radially outer surface of the nozzle ring 170. Optionally, as shown in FIG. 7, a sealing ring 227 can be disposed between the flange 226 and the nozzle ring 170 for sealing the interface therebetween. Also optionally, the vane sealing member 220 can include a flange 228 extending axially from a radially inner edge thereof, and the flange 228 can engage a groove formed in the second face 174 of the nozzle ring 170, thereby radially locating the vane sealing member relative to the nozzle ring. A sealing ring 229 can be disposed between the flange 228 and the opposing surface of the groove in the nozzle ring for sealing the interface therebetween.

The variable-nozzle assembly 150 includes a cam arrangement by which the unison ring 210 engages the vane sealing member 220 during rotation of the unison ring to the closed position in which the vanes 180 are positioned in their fully closed position. The cam arrangement is configured to move the vane sealing member 220 in a first axial direction against the proximal ends 182 of the vanes when the unison ring is moved to the closed position, and is configured to allow the vane sealing member 220 to move in a second axial direction opposite to the first axial direction when the unison ring is moved out of the closed position.

In accordance with one embodiment as illustrated in FIGS. 2 through 7, the cam arrangement comprises a plurality of circumferentially spaced cams 212 formed on the unison ring 210 (best seen in FIGS. 3 through 5), each cam 212 being sloped along a direction in which the cam moves when the unison ring 210 is rotated to the closed position. The cam arrangement further comprises a plurality of cam followers 230. Each cam follower 230 has a first end that engages a respective one of the cams 212 and an opposite second end that urges the vane sealing member 220 in the first axial direction (against the proximal ends 182 of the vanes) when the unison ring is rotated to the closed position. The unison ring is shown in the closed position in the drawings.

Figure 2:
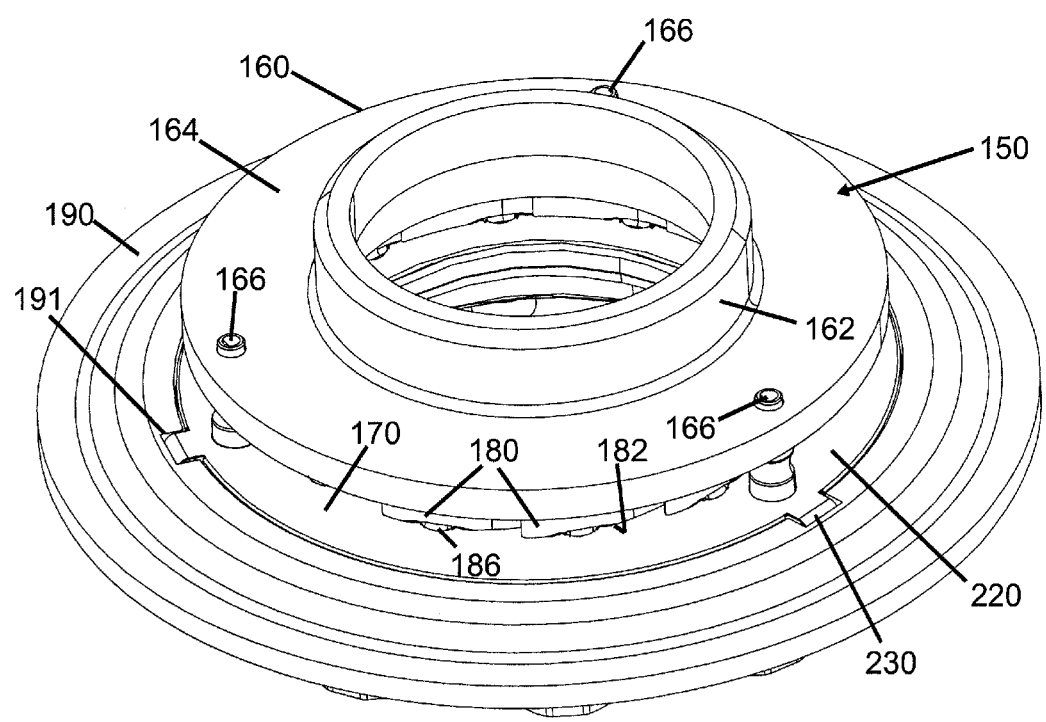
FIG. 2 is a perspective view of a variable-nozzle and retainer ring assembly in accordance with an embodiment of the invention.
Figure 3:
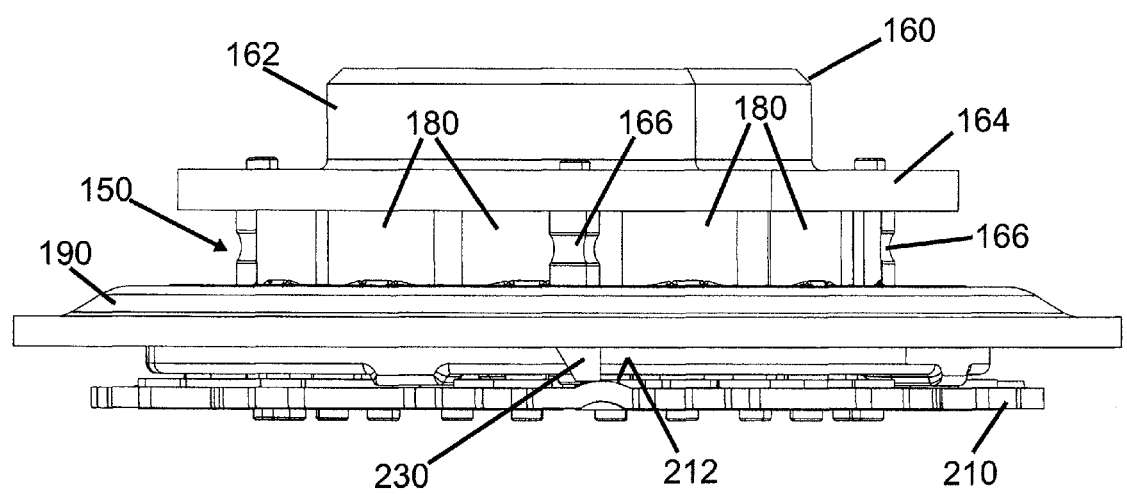
FIG. 3 is a side view of the variable-nozzle and retainer ring assembly of FIG. 2.
Figure 4:
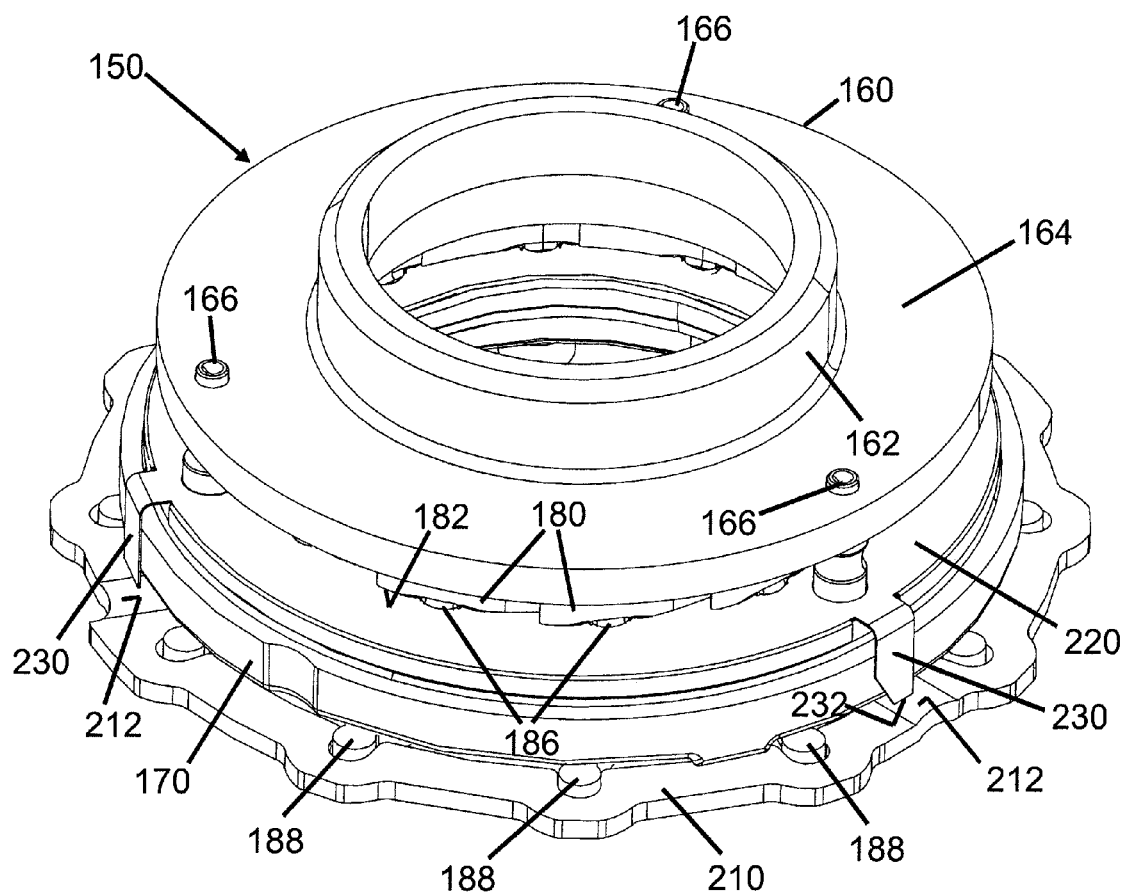
FIG. 4 is a perspective view of the variable-nozzle assembly of FIG. 2 without the retainer ring.
Figure 5:
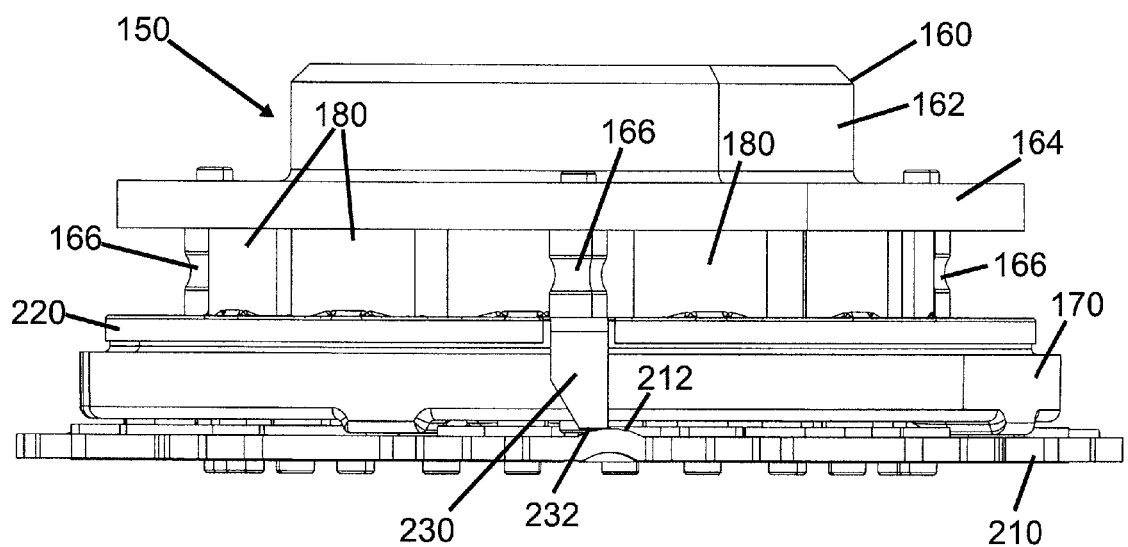
FIG. 5 is a side view of the variable-nozzle assembly of FIG. 4.
Figure 6:
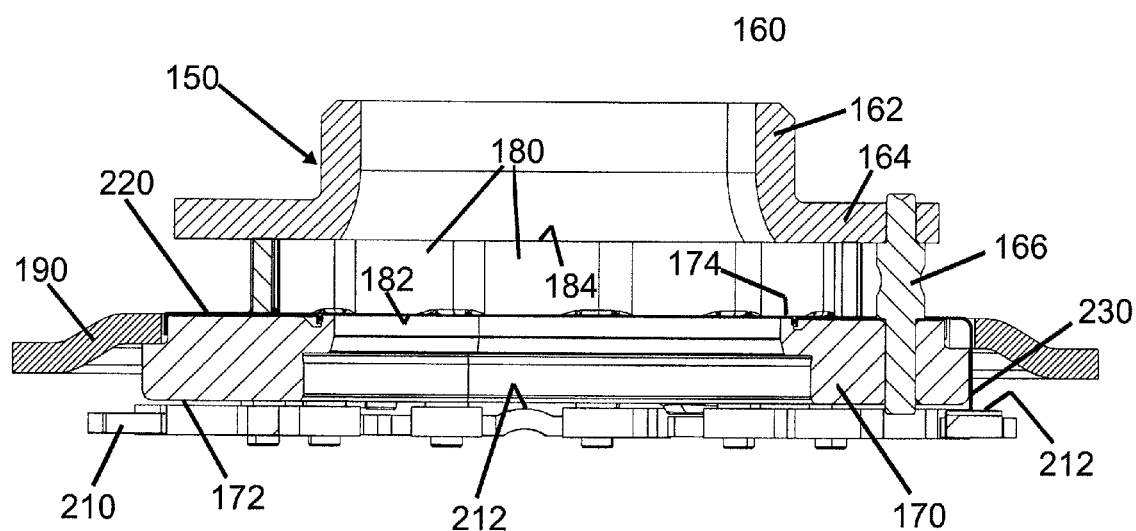
FIG. 6 is a cross-sectional view of the variable-nozzle and retainer ring assembly of FIG. 2.

In the illustrated embodiment of FIGS. 2-7, the cam followers 230 comprise integrally formed portions of the vane sealing member 220. Specifically, where the vane sealing member 220 is generally annular and has a radially inner edge and a radially outer edge, the cam followers can comprise protrusions that extend from the radially outer edge. Each protrusion has a portion that extends generally axially and terminates in an end 232 configured for engaging a respective one of the cams 212. In the illustrated embodiment there are three cam followers 230, but the invention is not limited to any particular number. The vane sealing member can comprise a sheet metal part and the protrusions can comprise sheet metal portions that are bent to form the portions that extend generally axially. As best seen in FIG. 2, the retainer ring 190 can include notches or cutouts 191 for accommodating the integral cam followers 230.

Figure 8:
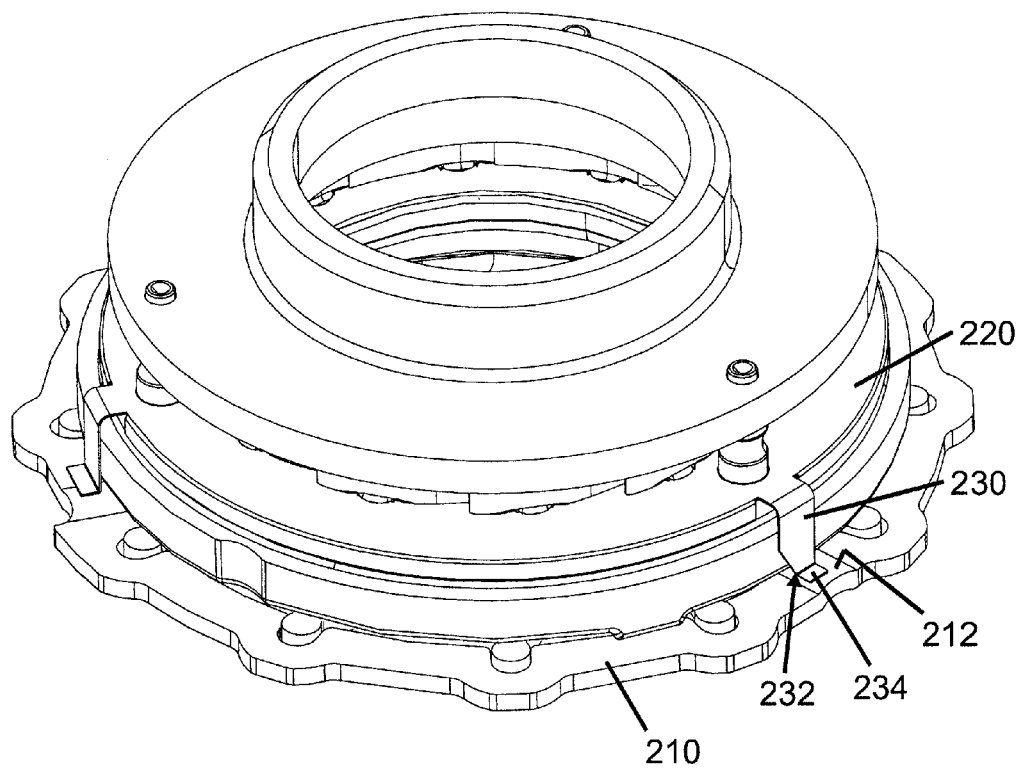
FIG. 8 is a perspective view of a variable-nozzle assembly in accordance with another embodiment of the invention.
Figure 9:
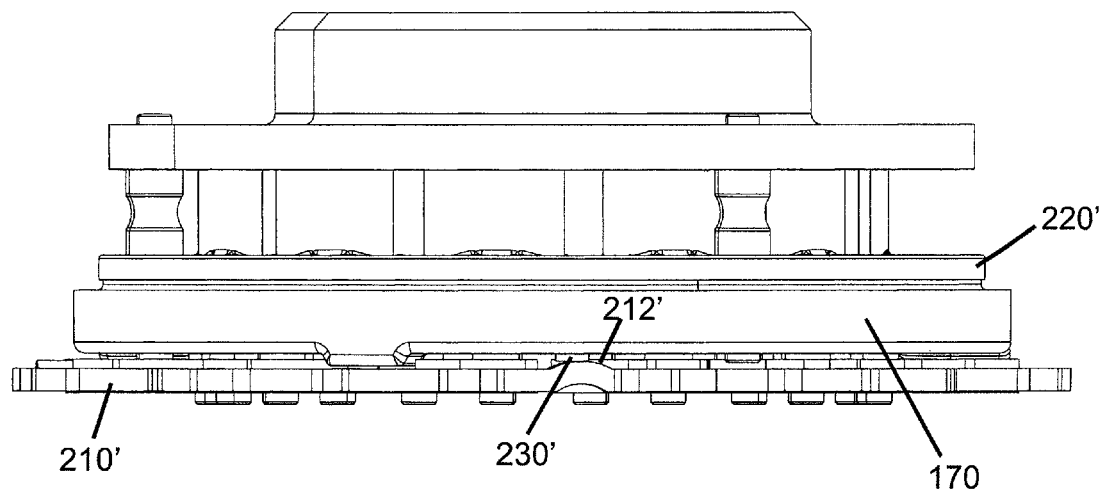
FIG. 9 is a side view of the variable-nozzle assembly of FIG. 8.
Figure 10:
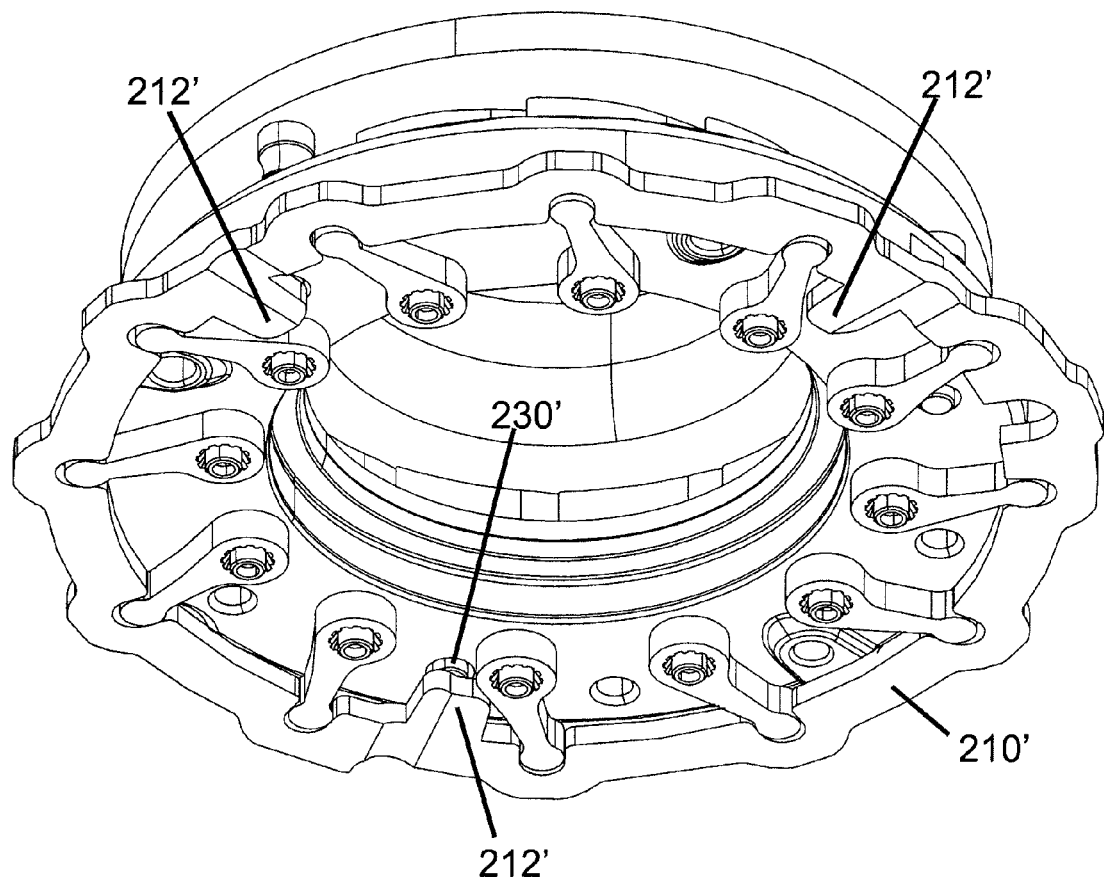
FIG. 10 is a further perspective view of the variable-nozzle assembly of FIG. 8.
Figure 11:
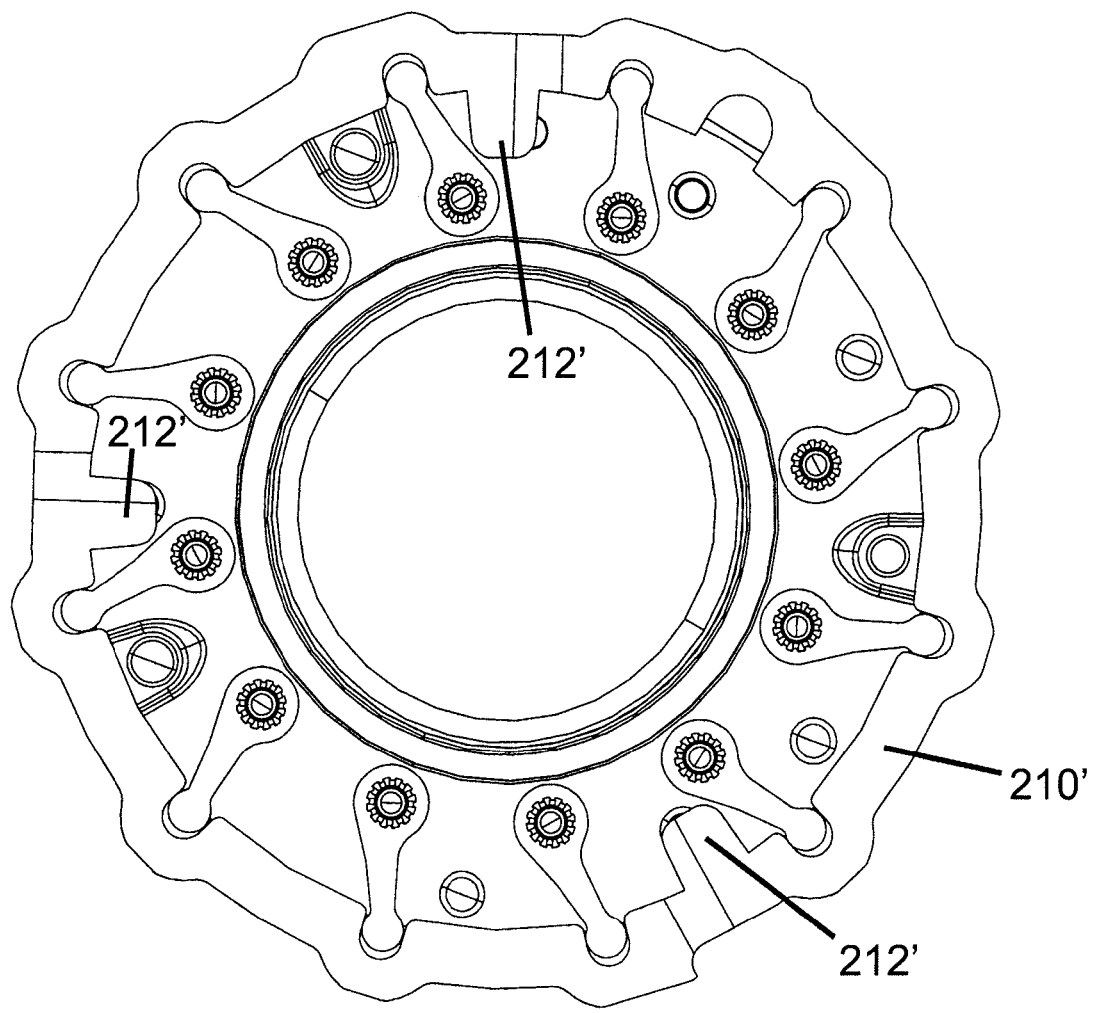
FIG. 11 is an elevation of the variable-nozzle assembly of FIG. 8.
Figure 12:
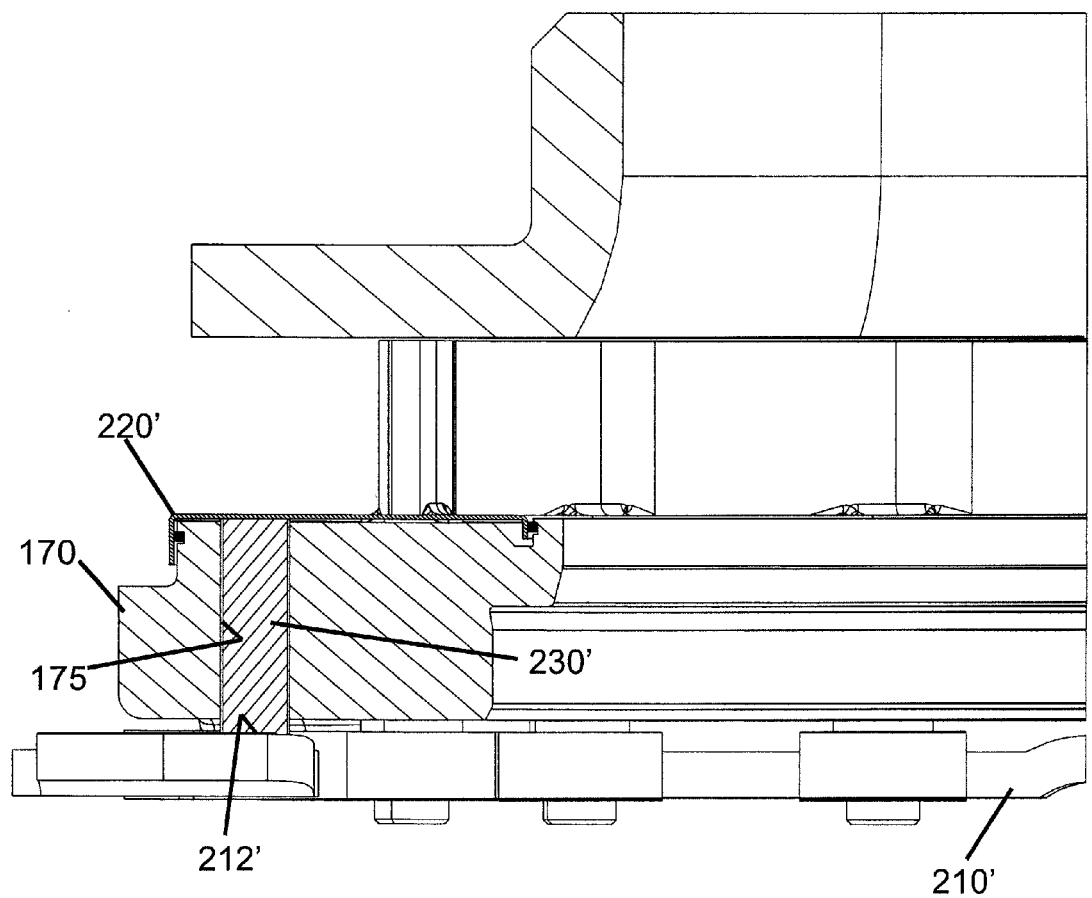
FIG. 12 is a fragmentary cross-sectional view of the variable-nozzle assembly of FIG. 8 on an enlarged scale.

FIG. 8 depicts an alternative embodiment that is generally the same as the embodiment described above, but in which the ends 232 of the protrusions (cam followers 230) define foot portions 234 that are bent to extend generally perpendicular to the portions that extend generally axially. The foot portions 234 engage the cams 212 of the unison ring 210.

FIGS. 9 through 12 illustrate a further alternative embodiment in which the cam followers 230' are formed separately from the vane sealing member 220'. The nozzle ring 170 defines a plurality of bores 175 (FIG. 12) extending axially therethrough, and the cam followers 230' extend through the bores 175. The cam followers 230' can comprise, for example, cylindrical pins or the like. One end of each cam follower 230' engages a respective one of the cams 212' on the unison ring 210' and the opposite end of the cam follower 230' engages the vane sealing member 220'. The cams 212' in the illustrated embodiment are integral portions of the unison ring that extend radially inwardly from a radially inner edge of the unison ring and are shaped to protrude out of the plane of the unison ring's face, axially toward the opposing face of the nozzle ring.

In the several embodiments described above, when the unison ring 210, 210' is in an open position (which places the vanes 180 in their open position), the cams 212, 212' do not engage the cam followers 230, 230' and thus the vane sealing member 220, 220' is allowed to move toward the nozzle ring 170 so that a clearance can exist between the vane sealing member and the proximal ends 182 of the vanes 180. When the unison ring is rotated to the closed position, the cams 212, 212' come into engagement with the cam followers 230, 230' and push the cam followers toward the vane sealing member 220, 220', urging the vane sealing member against the proximal ends 182 of the vanes. Advantageously, the vanes are free to move axially and thus the vane sealing member is able to push the vanes axially so that the distal ends 184 of the vanes are pushed against the nozzle portion 164 of the insert 160. In this fashion, the clearances between the vane ends and the nozzle walls are substantially reduced or eliminated in the closed position of the vanes.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger having a variable-nozzle assembly, comprising:
   a compressor housing and a compressor wheel mounted in the compressor housing and connected to a rotatable shaft, and a turbine housing and a turbine wheel mounted in the turbine housing and connected to the rotatable shaft, the turbine housing defining a chamber surrounding the turbine wheel for receiving exhaust gas from an engine and for supplying the exhaust gas through a nozzle leading from the chamber generally radially inwardly to the turbine wheel;
   a nozzle ring having opposite first and second faces, the nozzle being defined between the second face and an opposite wall, the nozzle ring having a plurality of circumferentially spaced-apart bearing apertures each extending axially from the first face to the second face;
   a plurality of vanes disposed in the nozzle and each having a proximal end and a distal end, the proximal ends of the vanes being proximate the second face of the nozzle ring, axles being joined to the proximal ends and being received into the bearing apertures of the nozzle ring and being rotatable in the bearing apertures, the vanes being rotatable between a closed position and an open position;
   a plurality of vane arms adjacent the first face of the nozzle ring and respectively affixed rigidly to the axles, each vane arm having a free end;
   a unison ring positioned generally coaxially with the nozzle ring with a face of the unison ring opposing the first face of the nozzle ring, the unison ring being engaged with the free ends of the vane arms and being rotatable about an axis of the nozzle ring so as to pivot the vane arms, thereby pivoting the vanes in unison, the unison ring being rotatable between a closed position corresponding to the closed position of the vanes and an open position corresponding to the open position of the vanes;
   a vane sealing member having a portion disposed between the second face of the nozzle ring and the proximal ends of the vanes; and
   a cam arrangement by which the unison ring engages the vane sealing member during rotation of the unison ring to the closed position, the cam arrangement being configured to move the vane sealing member in a first axial direction against the proximal ends of the vanes when the unison ring is moved to the closed position such that clearances between the vane sealing member and the proximal ends are reduced or eliminated, and being configured to allow the vane sealing member to move in a second axial direction opposite to the first axial direction when the unison ring is moved out of the closed position.

2. The turbocharger of claim 1, wherein the cam arrangement comprises a plurality of circumferentially spaced cams formed on the unison ring, each cam being sloped along a direction in which the cam moves when the unison ring is rotated to the closed position, the cam arrangement further comprising a plurality of cam followers, each cam follower having a first end that engages a respective one of the cams and an opposite second end that urges the vane sealing member in the first axial direction when the unison ring is rotated to the closed position.

3. The turbocharger of claim 2, wherein the cam followers comprise integrally formed portions of the vane sealing member.

4. The turbocharger of claim 3, wherein the vane sealing member is generally annular and has a radially inner edge and a radially outer edge, and wherein the cam followers comprise protrusions that extend from the radially outer edge, each protrusion having a portion that extends generally axially and terminates in an end configured for engaging a respective one of the cams.

5. The turbocharger of claim 4, wherein the vane sealing member comprises a sheet metal part and the protrusions comprise sheet metal portions that are bent to form the portions that extend generally axially.

6. The turbocharger of claim 5, wherein the ends of the protrusions define foot portions that are bent to extend generally perpendicular to the portions that extend generally axially, the foot portions engaging the cams of the unison ring.

7. The turbocharger of claim 2, wherein the cam followers are formed separately from the vane sealing member.

8. The turbocharger of claim 7, wherein the nozzle ring defines a plurality of bores extending axially therethrough, and the cam followers extend through the bores.

9. The turbocharger of claim 8, wherein the cam followers comprise pins.

10. The turbocharger of claim 1, wherein the vanes are free to move axially relative the nozzle ring, and the vane sealing member urges the vanes axially such that the distal ends of the vanes are pushed against the opposite wall of the nozzle when the unison ring is in the closed position such that clearances between the opposite wall and the distal ends are reduced or eliminated.

* * * * *